US012297982B2

(12) United States Patent
Liao

(10) Patent No.: US 12,297,982 B2
(45) Date of Patent: May 13, 2025

(54) ILLUMINATOR ACCESSORY EXCHANGE STRUCTURE

(71) Applicant: GUAY GUAY TRADING CO., LTD., Changhua County (TW)

(72) Inventor: Yin-Hsi Liao, Changhua County (TW)

(73) Assignee: GUAY GUAY TRADING CO., LTD., Changhua County (TW)

( * ) Notice: Subject to any disclaimer, the term of this patent is extended or adjusted under 35 U.S.C. 154(b) by 0 days.

(21) Appl. No.: 18/614,754

(22) Filed: Mar. 25, 2024

(65) Prior Publication Data

US 2025/0060087 A1 Feb. 20, 2025

(30) Foreign Application Priority Data

Aug. 18, 2023 (TW) ................................ 112208824

(51) Int. Cl.

*F21V 17/00* (2006.01)
*A63H 33/22* (2006.01)
*F21V 15/01* (2006.01)
*F21V 17/12* (2006.01)
*F21V 33/00* (2006.01)
*A63H 5/04* (2006.01)

(52) U.S. Cl.

CPC ........... *F21V 17/002* (2013.01); *A63H 33/22* (2013.01); *F21V 15/01* (2013.01); *F21V 17/12* (2013.01); *F21V 33/008* (2013.01); *A63H 5/04* (2013.01)

(58) Field of Classification Search

CPC ................................ A63H 5/04; F41G 11/001
See application file for complete search history.

(56) References Cited

U.S. PATENT DOCUMENTS 3,938,262 A * 2/1976 Dye ...................... F41G 3/2655 434/21
5,309,337 A * 5/1994 Groben ............... F21V 33/0064 362/206
5,448,834 A * 9/1995 Huang .................... F41G 1/545 279/2.12
6,276,088 B1 * 8/2001 Matthews .............. H01H 13/08 42/1.03
7,827,726 B2 * 11/2010 Stokes ...................... F41G 1/35 42/146
7,954,273 B1 * 6/2011 Swan ........................ F41G 1/35 42/117

(Continued)

*Primary Examiner* — Zheng Song
(74) *Attorney, Agent, or Firm* — Leong C. Lei

(57) ABSTRACT

An illuminator accessory exchange structure includes an illuminator body arranged on a toy gun, a first connecting portion arranged on the illuminator body, a sleeve element sleeved outside of the illuminator body, a second connecting portion arranged on the sleeve element, a shaping portion arranged on an outer surface of the sleeve element, a front cover element arranged on a front end of the illuminator body and the sleeve element, and a first and a second coupling portion respectively corresponding to and connecting with the first and second connecting portions. By means of the arrangement of the first and second coupling portions and the first and second connecting portions, the front cover element is used to fix the sleeve element on the outside of the illuminator body, and the arrangement eases replacing of the sleeve element, in order to exchange for a sleeve element having a different shaping portion.

8 Claims, 15 Drawing Sheets

(56) References Cited

U.S. PATENT DOCUMENTS

| | | | | |
|---|---|---|---|---|
| 8,132,354 | B1 * | 3/2012 | Sellers | F41G 1/54<br>42/116 |
| 9,267,758 | B2 * | 2/2016 | Risicato | F41G 1/35 |
| 2002/0105796 | A1 * | 8/2002 | Naghi | F21V 33/0084<br>362/120 |
| 2005/0116815 | A1 * | 6/2005 | Chen | F41G 1/35<br>340/331 |
| 2009/0260270 | A1 * | 10/2009 | Wu | F41G 1/35<br>42/133 |
| 2011/0063822 | A1 * | 3/2011 | Qiu | F21V 14/025<br>362/188 |
| 2021/0180915 | A1 * | 6/2021 | Kilgore | F41G 1/35 |

* cited by examiner

ILLUMINATOR ACCESSORY EXCHANGE STRUCTURE

BACKGROUND OF THE INVENTION

(a) Technical Field of the Invention

The present invention provides a replacement structure for an illuminator accessory to allow an illuminator that is used in a toy gun for simulating flaming to have an easily exchangeable outside shape part.

(b) Description of the Prior Art

Among various sports, survival games or shooting sports, such as paintball, are the ones that best resemble actual combating and are also favorable leisure activities for a lot of people. To pursue the fidelity of simulation for the toy guns and the perception of in situ reality, the players often attach some accessories and install modification kits on the toy guns, such as mounting an illuminator on a toy gun to simulate flaming on a muzzle during gun shooting.

However, there are still problems and shortcomings, as listed below, to be alleviated for the use of the above illuminators:

Firstly, the illuminator is often mounted inside a toy gun or installed at a front end of the muzzle. For those mounted inside the toy gun, when there is a need to replace the illuminator, such as replacement for a broken one, it is necessary to disassemble the toy gun in order to remove the illuminator. Such an operation is tedious.

Secondly, for the illuminators that are installed at the front end of the muzzle, the illuminator is exposed outside the toy gun and consequently, the outside appearance of the illuminator influences the visual effect of the entirety of the toy gun, and there may be needs for change of the outside appearance of the illuminator. The illuminator is generally expensive, to spend a large amount to exchange the illuminator just for improving outside aesthetics does not seem economically good for the users.

Thirdly, for change of the outside appearance of the illuminator, it is generally not possible to replace the outer casing of the illuminator alone, or the operation of replacement is very complicated.

SUMMARY OF THE INVENTION

The primary objective of the present invention is to arrange a first coupling portion and a second coupling portion on a front cover element to allow a sleeve element to be individually removable from an illuminator body so as to reduce the cost for exchanging the outside appearance of an illuminator and to simplify the operation of exchanging.

To achieve the above objective, a main structure of the present invention comprises: an illuminator body, a first connecting portion, a sleeve element, a second connecting portion, at least one shaping portion, a front cover element, a first coupling portion, and a second coupling portion, wherein the illuminator body is arranged on a toy gun, the first connecting portion being arranged on the illuminator body, the sleeve element being sleeved outside of the illuminator body, the second connecting portion being arranged on the sleeve element, the shaping portion being arranged on an outer surface of the sleeve element, the front cover element being arranged at a front end of the illuminator body and the sleeve element, the first coupling portion being arranged on one side of the front cover element and corresponding to and connecting with the first connecting portion, the second coupling portion being arranged on one side of the front cover element and corresponding to and connecting with the second connecting portion.

When a user uses the present invention to exchange an illuminator accessory, since the shaping portion is arranged on a surface of the sleeve element, and the sleeve element and the illuminator body are of a detachable arrangement, the user is allowed to achieve the purpose of exchanging the outside appearance of the illuminator in a condition of not replacing the illuminator body. Further, since the sleeve element and the illuminator body are fixed by means of the front cover element, to detach, it only needs to separate the first coupling portion from the first connecting portion, and also to separate the second coupling portion from the second connecting portion, the front cover element can be easily removed to allow for easy removal of the sleeve element that is sleeved outside of the illuminator body for quick exchange with a sleeve element having a different shaping portion, so that through the operation of exchanging the sleeve element alone, the cost of changing the illuminator outside appearance can be reduced, and the operation of replacing the illuminator can be simplified.

Based on the above technique, the problems of the prior art the illuminator that an operation of replacing the illuminator is tedious and it is impossible to change the casing of the illuminator alone, and the cost of replacing is relatively high can be overcome to thereby fulfill the above-discussed advantages.

DETAILED DESCRIPTION OF THE PREFERRED EMBODIMENTS

Figure 1:
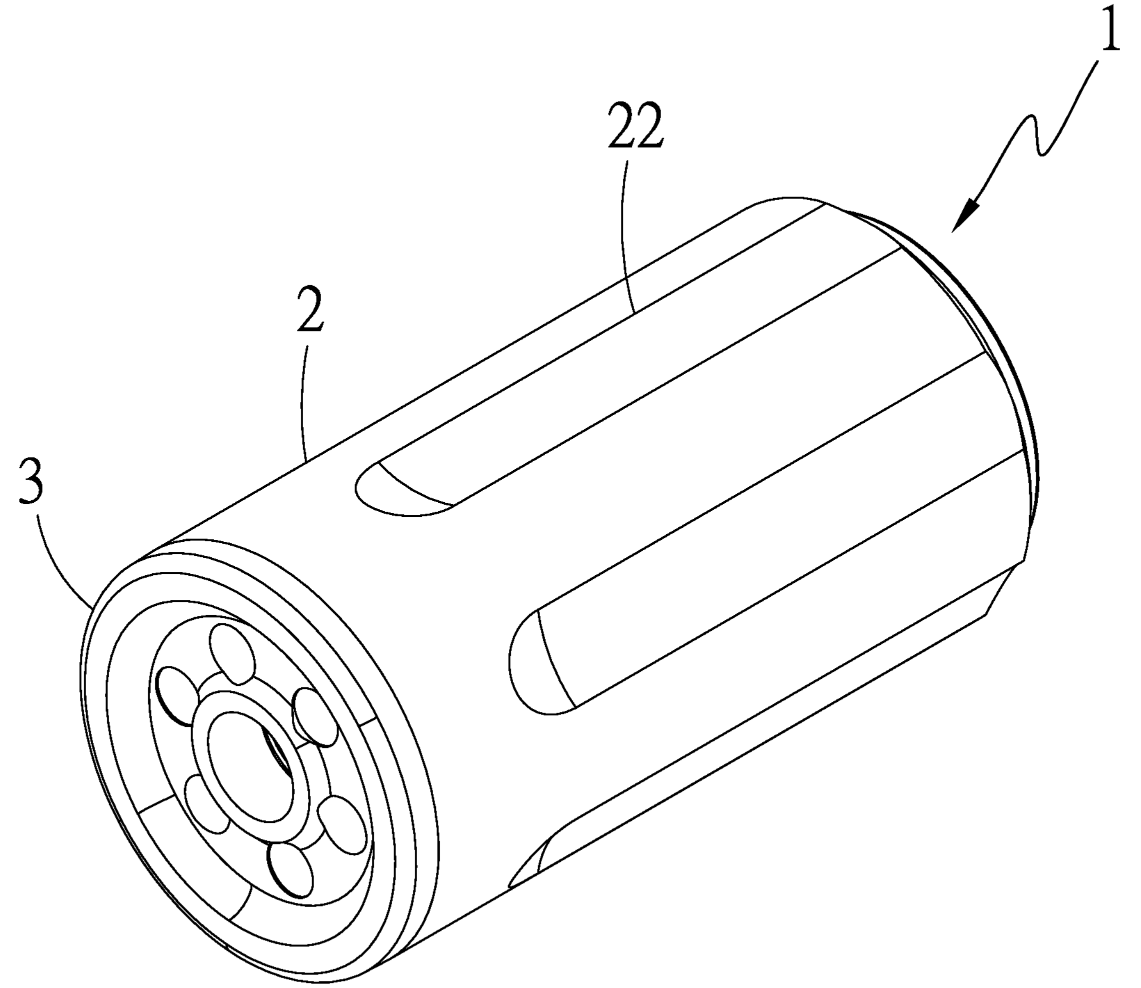
FIG. 1 is a perspective view showing a first preferred embodiment of the present invention.
Figure 2:
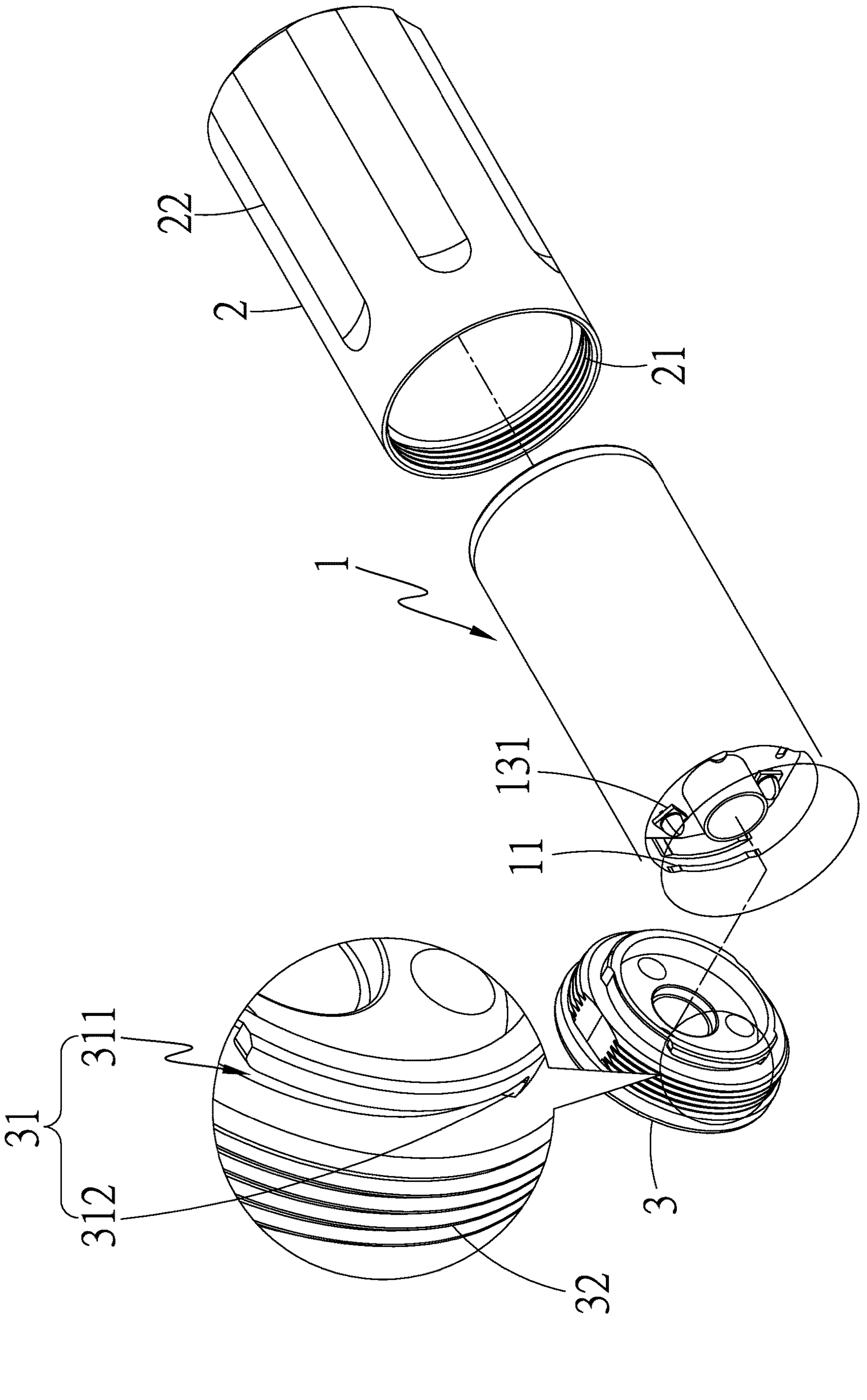
FIG. 2 is an exploded view showing the first preferred embodiment of the present invention.
Figure 3:
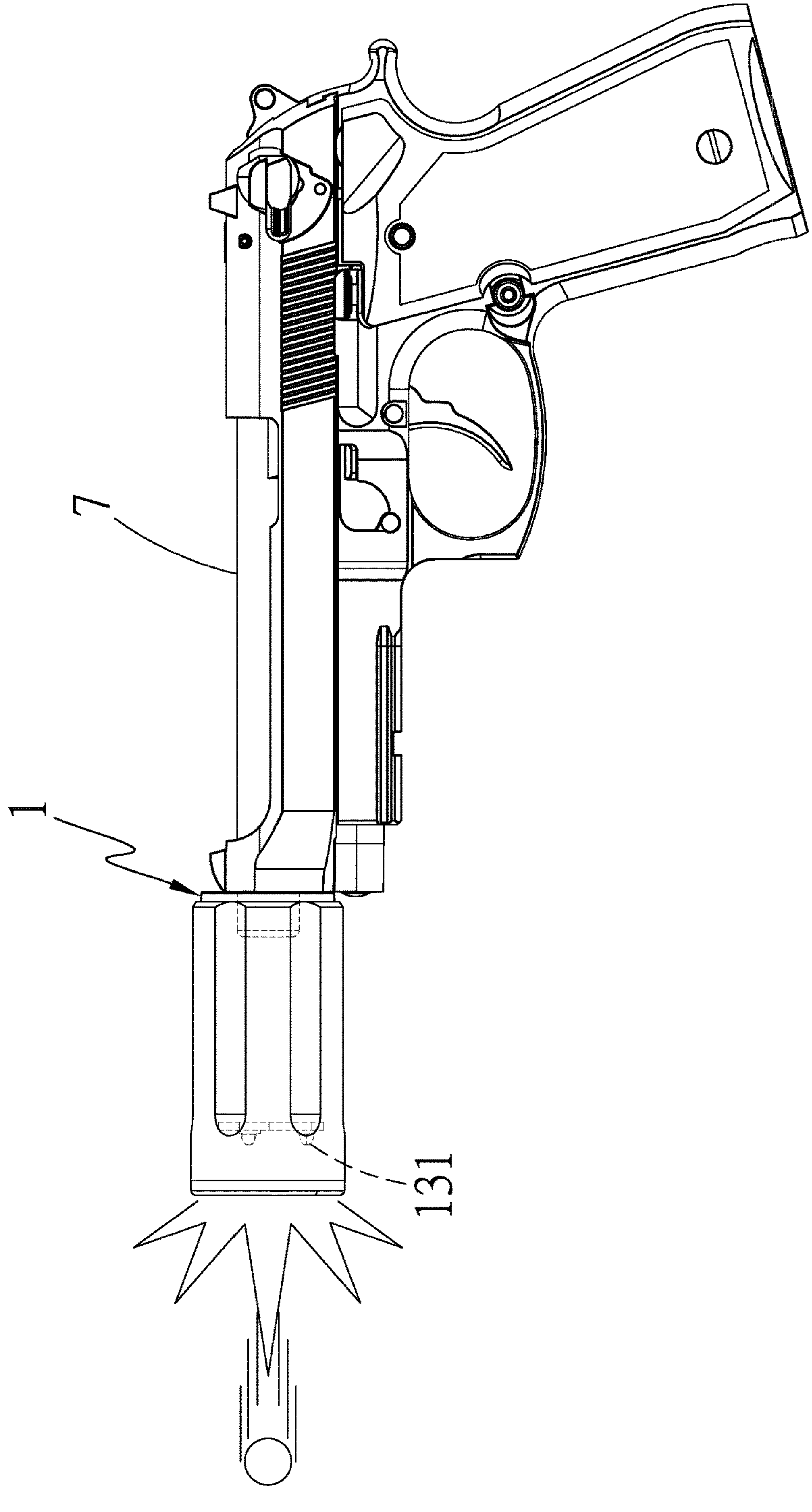
FIG. 3 is a schematic view showing a state of use of the first preferred embodiment of the present invention.

Referring to FIGS. 1 and 2, which are respectively a perspective view and an exploded view of a first preferred embodiment of the present invention, it is clearly seen from the drawings that the present invention comprises:

an illuminator body 1, which is arranged on a toy gun;

a first connecting portion 11, which is arranged on the illuminator body 1;

a sleeve element 2, which is sleeved outside of the illuminator body 1;

a second connecting portion 21, which is arranged on the sleeve element 2;

at least one shaping portion 22, which is arranged on an outer surface of the sleeve element 2;

a front cover element 3, which is arranged on a front end of the illuminator body 1 and the sleeve element 2;

a first coupling portion 31, which is arranged at one side of the front cover element 3 and corresponds to and connects with the first connecting portion 11, wherein the first coupling portion 31 includes a guide groove 311 and a stop portion 312 formed at an end of the guide groove 311; and a second coupling portion 32, which is arranged at one side of the front cover element 3 and corresponds to and connects with the second connecting portion 21.

The illuminator body 1 functions as a flaming and lighting simulator of the toy gun, and is an illuminator that simulates light and flame of gun shooting by means of light from light emitting elements 131. The sleeve element 2 is arranged on the illuminator body 1 in a detachable manner, and is directly sleeved over the outside of the illuminator body 1. The shaping portion 22 is a line pattern or character signs on the outside of the sleeve element 2 and can be formed by means of printing, spray-coating, adhering, engraving, or relief, and in the instant embodiment, an engraved line pattern is taken as an example for illustration. The first coupling portion 31 and the first connecting portion 11 are of a recess-and-projection engagement and combination arrangement, and in the instant embodiment, the first coupling portion 31 is the recessed portion and includes the guide groove 311, while the first connecting portion 11 is a block projecting from and formed on an inner edge of an end face of the illuminator body 1. The second coupling portion 32 and the second connecting portion 21 are of a thread-fastening arrangement. The configurations that correspond to the above elements are provided as examples of the preferred embodiment, and configurations that possess the same functions are considered belonging to the scope of the present invention, and not limited to the examples illustrated above.

With the above description, the structure of the inventive technique can be appreciated, and based on corresponding combination of such a structure, an advantage of enabling easy change and replacement of the outside-appearance shaping portion 22 of the illuminator that functions to simulate flaming of the toy gun can be achieved. A detailed explanation will be provided below.

Figure 4:
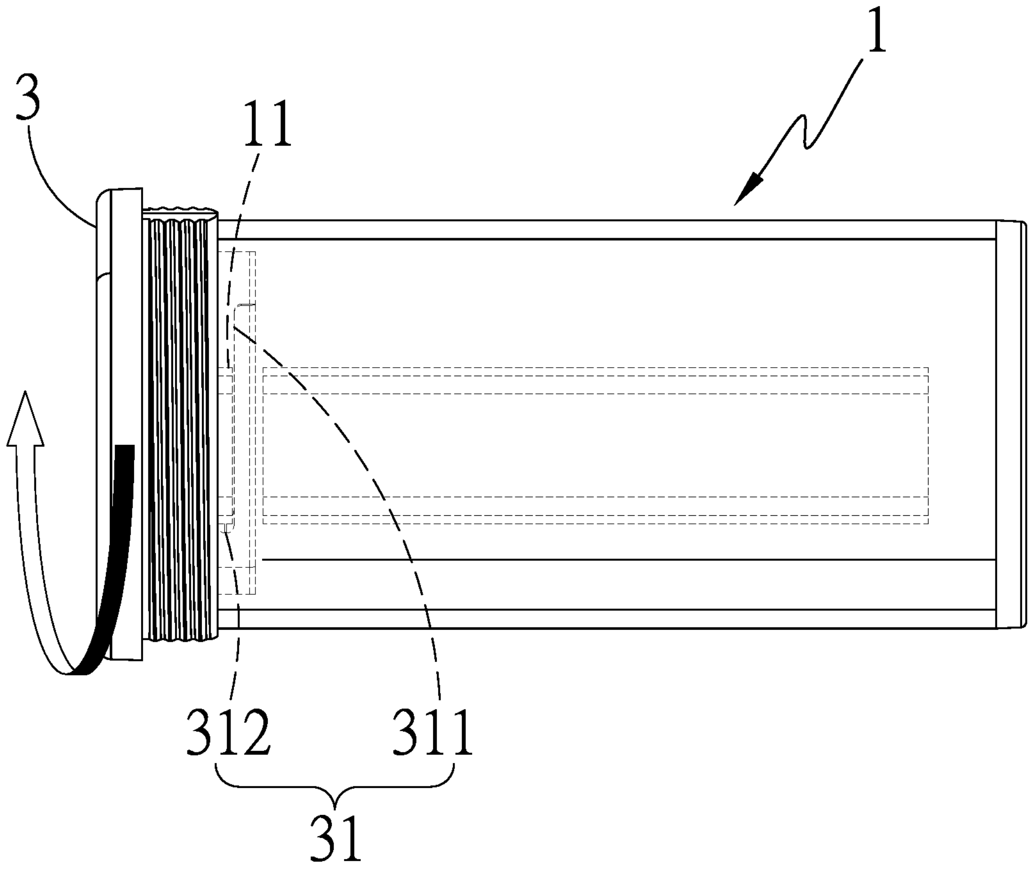
FIG. 4 is a schematic view showing dismounting of the first preferred embodiment of the present invention.
Figure 5:
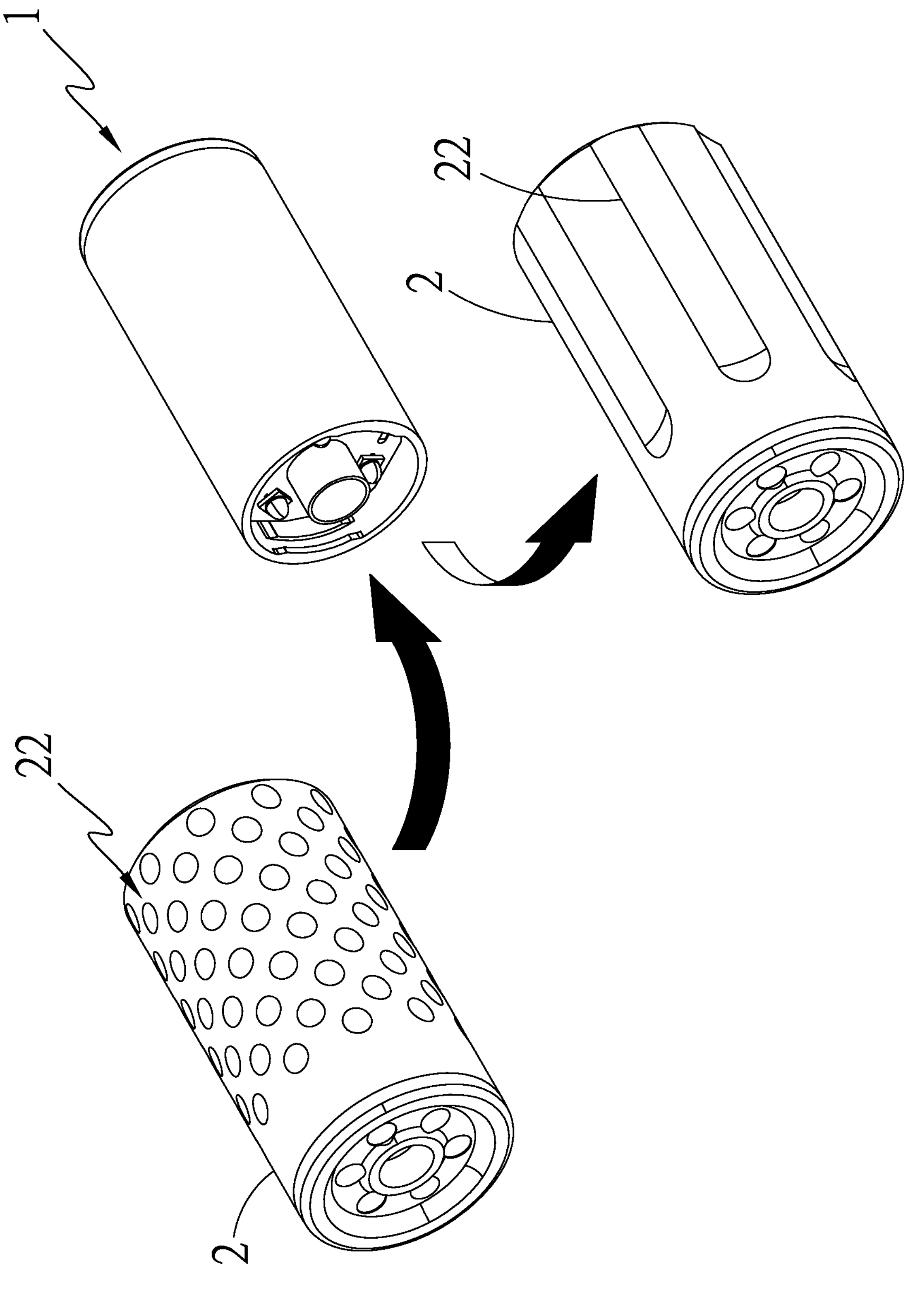
FIG. 5 is a schematic view showing exchanging of the first preferred embodiment of the present invention.

Referring jointly to FIGS. 1-5, which are a perspective view to a schematic view of exchanging of the first preferred embodiment of the present invention, in assembling of the above components, it is clearly seen from the drawings that in the instant embodiment, the shaping portion 22 is arranged on a surface of the sleeve element 2, and the sleeve element 2 and the illuminator body 1 are of a detachable arrangement to allow a user to achieve exchange of the outside appearance of the illuminator in a condition of not replacing the illuminator body 1. Since the sleeve element 2 and the illuminator body 1 are separately fixed by using the front cover element 3, to detach, it only needs to separate the first coupling portion 31 and the first connecting portion 11, or to simultaneously separate the second coupling portion 32 and the second connecting portion 21, in order to easily dismount the front cover element 3. In a practical operation, as shown in FIG. 4, which is a plan see-through view with the sleeve element 2 being invisible, it only needs to rotate the first coupling portion 31 of the front cover element 3 to have the first connecting portion 11 rotating along the guide groove 311 in a direction away from the stop portion 312, by rotation of approximately 90 degrees, to have the first coupling portion 31 detach and separate from the first connecting portion 11 of the illuminator body 1 so as to have the front cover element 3 separated from the illuminator body 1. At this moment, although the sleeve element 2 is still sleeved over the outside of the illuminator body 1, there is no fixing or fastening structure between the two, and the illuminator body 1 is fixed on the toy gun 7, so that it only needs to directly pull the sleeve element 2 out to easily remove the sleeve element 2 that is sleeved over the outside of the illuminator body 1 and the front cover element 3 for replacement. If it only needs to exchange the sleeve element 2, then the second coupling portion 32 can be caused to rotate relative to the second connecting portion 21 to then separate the front cover element 3 from the sleeve element 2 to achieve the purpose of fast exchange with a sleeve element 2 having a different shaping portion 22, so that by means of an operation of replacing only the sleeve element 2, the cost for replacing the outside appearance of the illuminator can be reduced, and the operation of replacing the illuminator can be simplified.

On the other hand, for an operation of assembling after the replacement, it only needs to do the operation in an opposite fashion. It is noted that in rotating the front cover element 3 to have the first coupling portion 31 connecting with the first connecting portion 11 of the illuminator body 1, except rotating along the guide groove 311, since the guide groove 311 is provided, at the end thereof, with the stop portion 312, the range of rotation of the front cover element 3 can be limited to prevent over rotation that causes the first coupling portion 31 from re-separating from the first connecting portion 11 in order to surely fix the front cover element 3 with the illuminator body 1.

Figure 6:
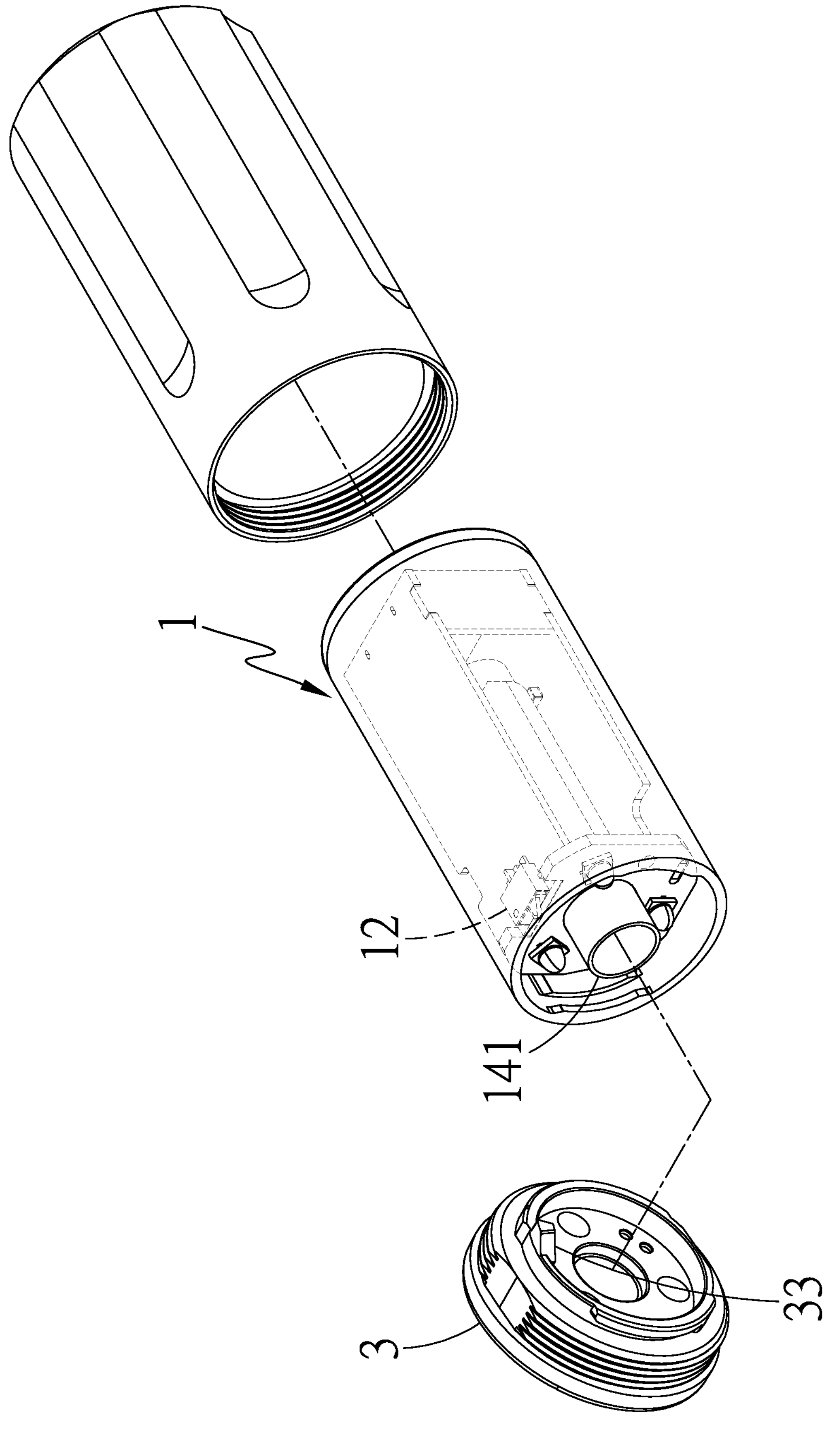
FIG. 6 is an exploded view showing a second preferred embodiment of the present invention.
Figure 7:
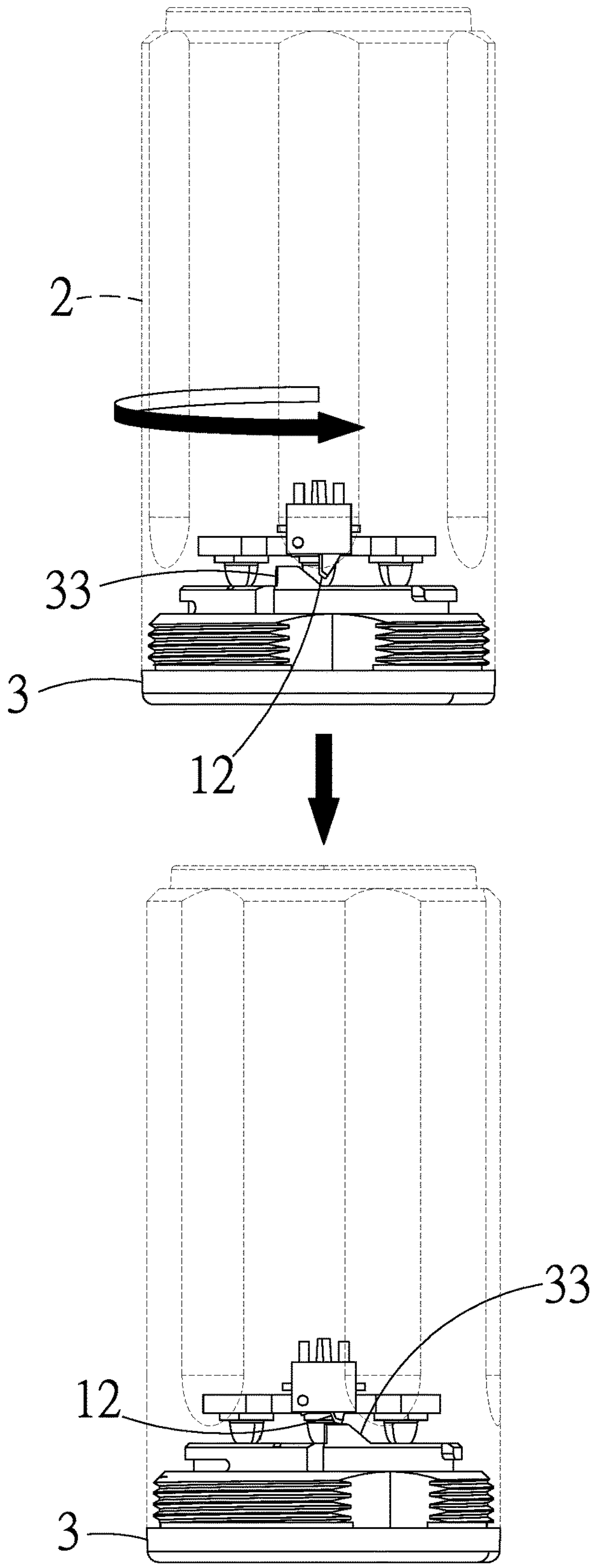
FIG. 7 is a schematic view showing switch contacting of the second preferred embodiment of the present invention.
Figure 8:
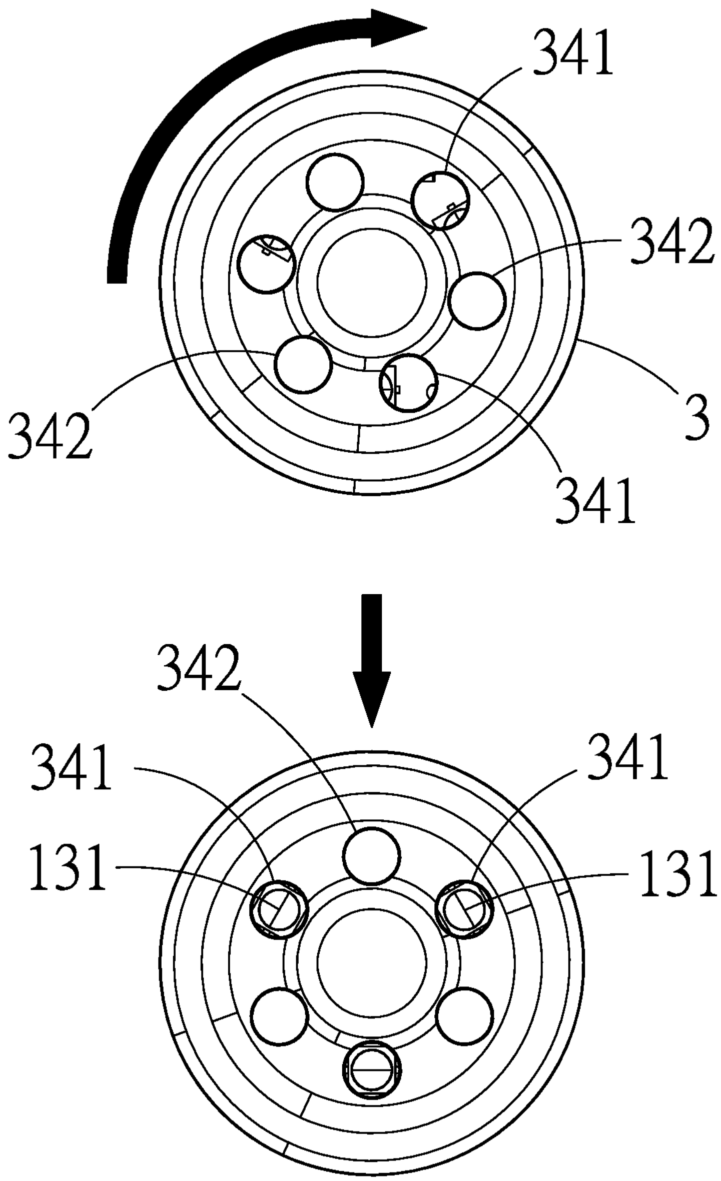
FIG. 8 is a schematic view showing front cover rotating of the second preferred embodiment of the present invention.

Referring jointly to FIGS. 6-8, which are an exploded view to a schematic view of front cover rotating of a second preferred embodiment of the present invention, it is clearly seen from the drawings that the instant embodiment is generally similar to the previous embodiment and only different in that a changeover switch 12 is arranged in an interior of the illuminator body 1, and an actuation block 33 is arranged at one side of the front cover element 3 for contacting the changeover switch 12, and the front cover element 3 is formed with a plurality of light-transmitting holes 341 and a plurality of shielding troughs 342, and the illuminator body 1 comprises a plurality of light emitting elements 131, and based on whether the changeover switch 12 is switched or not, the light emitting elements 131 are set to correspond, in position, to the light-transmitting holes 341 or the shielding troughs 342. The changeover switch 12 is a press-down switch that is operable for activating or de-activating the illuminator body 1 in order to connect or cut off a trigger firing operation of the toy gun, and in the instant embodiment, the actuation block 33 pressing down the changeover switch 12 establishes a state of enabling activation. In other words, when attempting to change the state of the changeover switch 12, the user only needs to rotate, for a small range, the front cover element 3 in combination with the sleeve element 2, in order to have the actuation block 33 on the inner side of the front cover element 3 located on the changeover switch 12 to naturally complete the operation of pressing down. Since the rotation range is small, it does not cause the front cover element 3 to separate from the illuminator body 1. Further, the rotation of the front cover element 3 simultaneously bring the light-transmitting holes 341 and the shielding troughs 342 to rotate so as to have the light emitting elements 131 corresponding to the light-transmitting holes 341 or the shielding troughs 342 in position, and in the instant embodiment, the number of the light emitting elements 131 is three, which are circumferentially arranged around a projectile exit hole 141 at intervals, and the numbers of the light-transmitting holes 341 and the shielding troughs 342 are also three and are circumferentially arranged in an alternate manner. When the changeover switch 12 is in a de-activation state, the shielding troughs 342 are rotated to positions corresponding to the light emitting elements 131, and similarly, when the changeover switch 12 is in an activation state, the light-transmitting holes 341 are rotated to positions corresponding to the light emitting elements 131. Regardless if the changeover switch 12 is in an activation state or a de-activation state, the front cover element 3 shows an outside configuration of circumferential or annual arrangement of six circles. As such, this allows the user to select if to activate the illuminator body 1, and the outside appearance is not affected whether activated or not.

Figure 9:
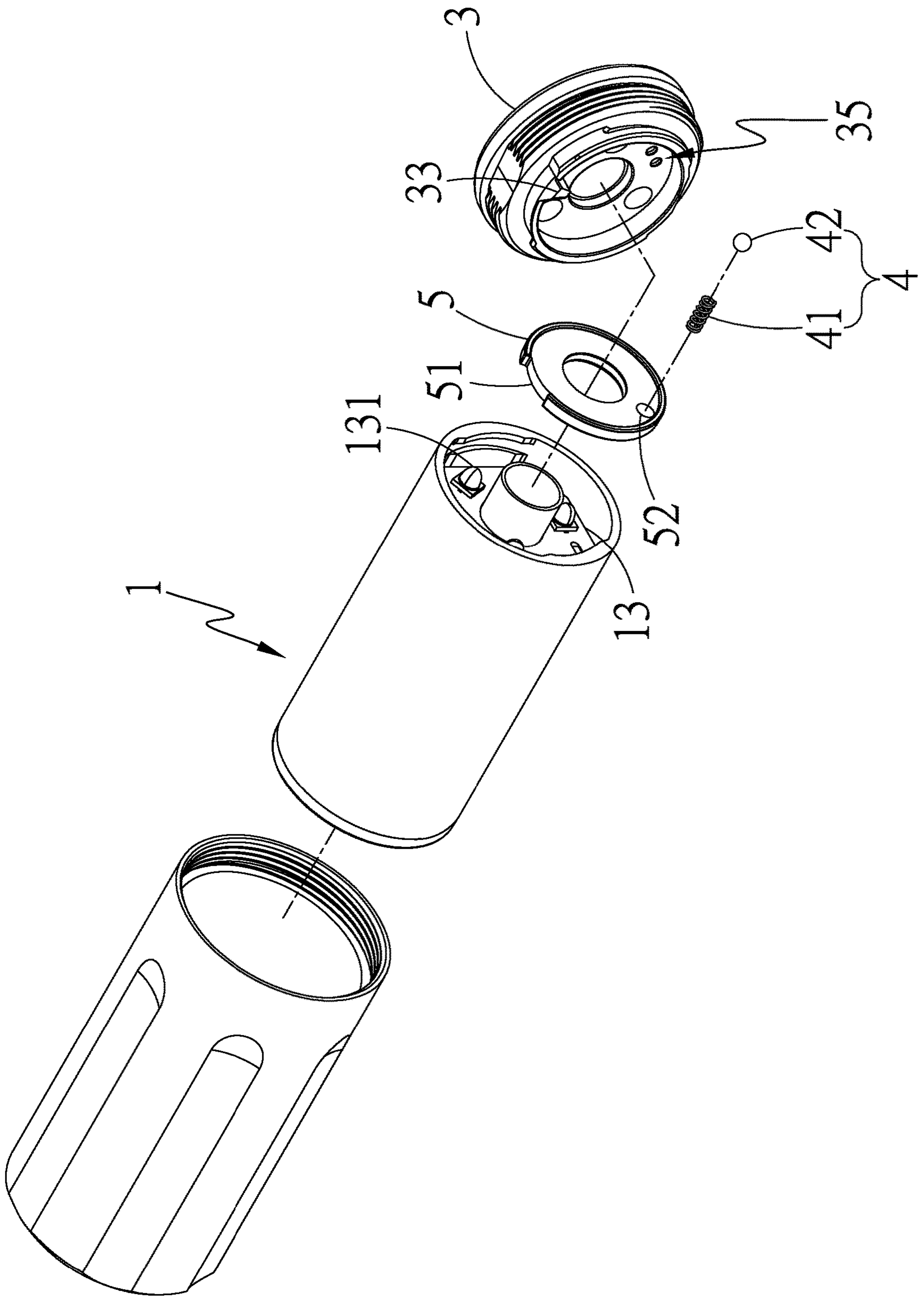
FIG. 9 is an exploded view showing a third preferred embodiment of the present invention.
Figure 10:
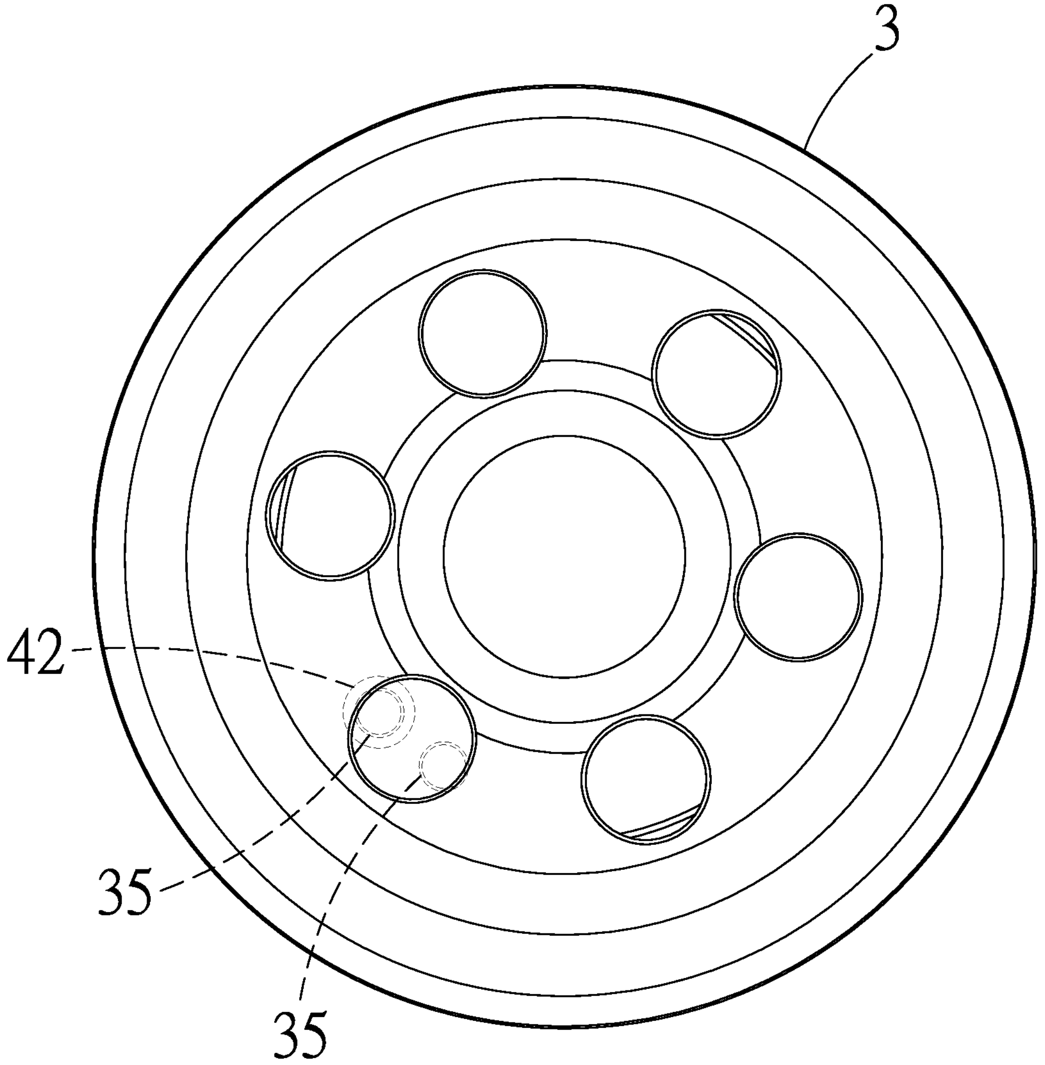
FIG. 10 is a schematic view showing implementing of the third preferred embodiment of the present invention.
Figure 11:
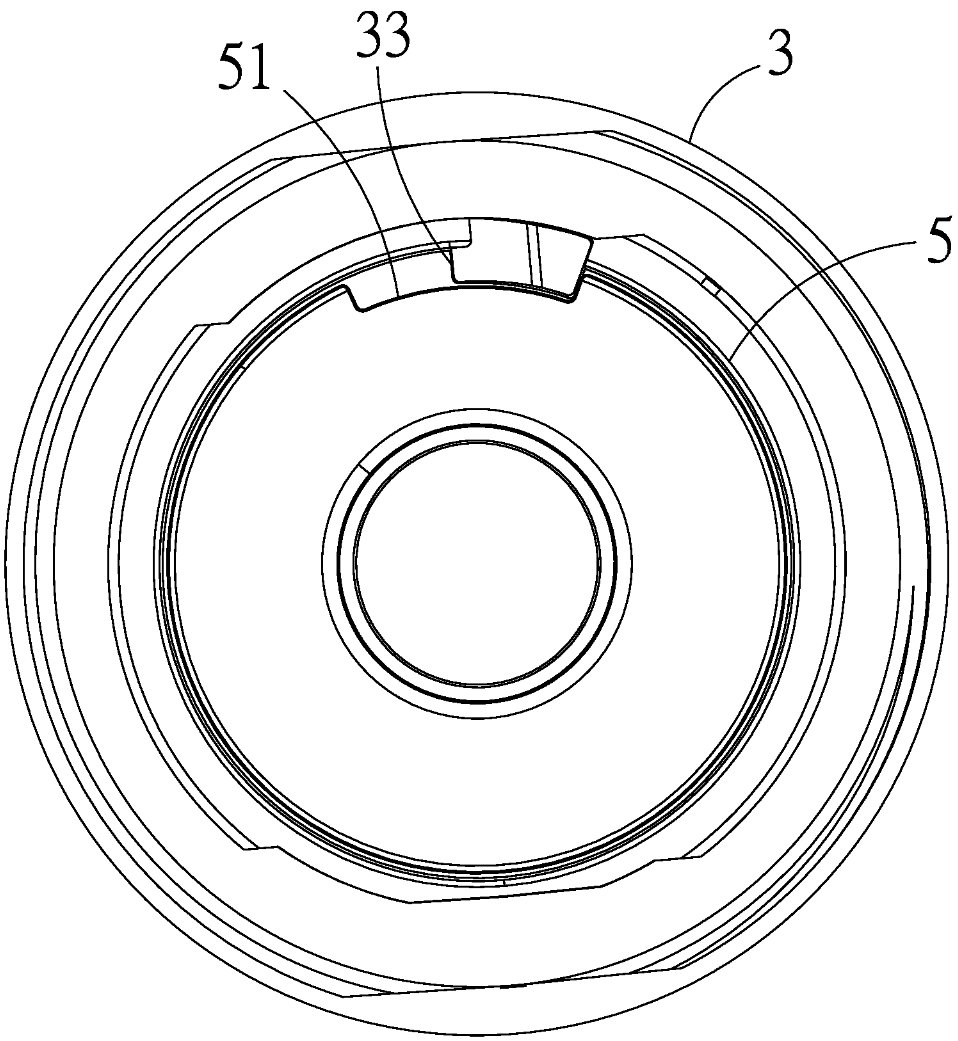
FIG. 11 is a schematic view showing a structure of the third preferred embodiment of the present invention.
Figure 12:
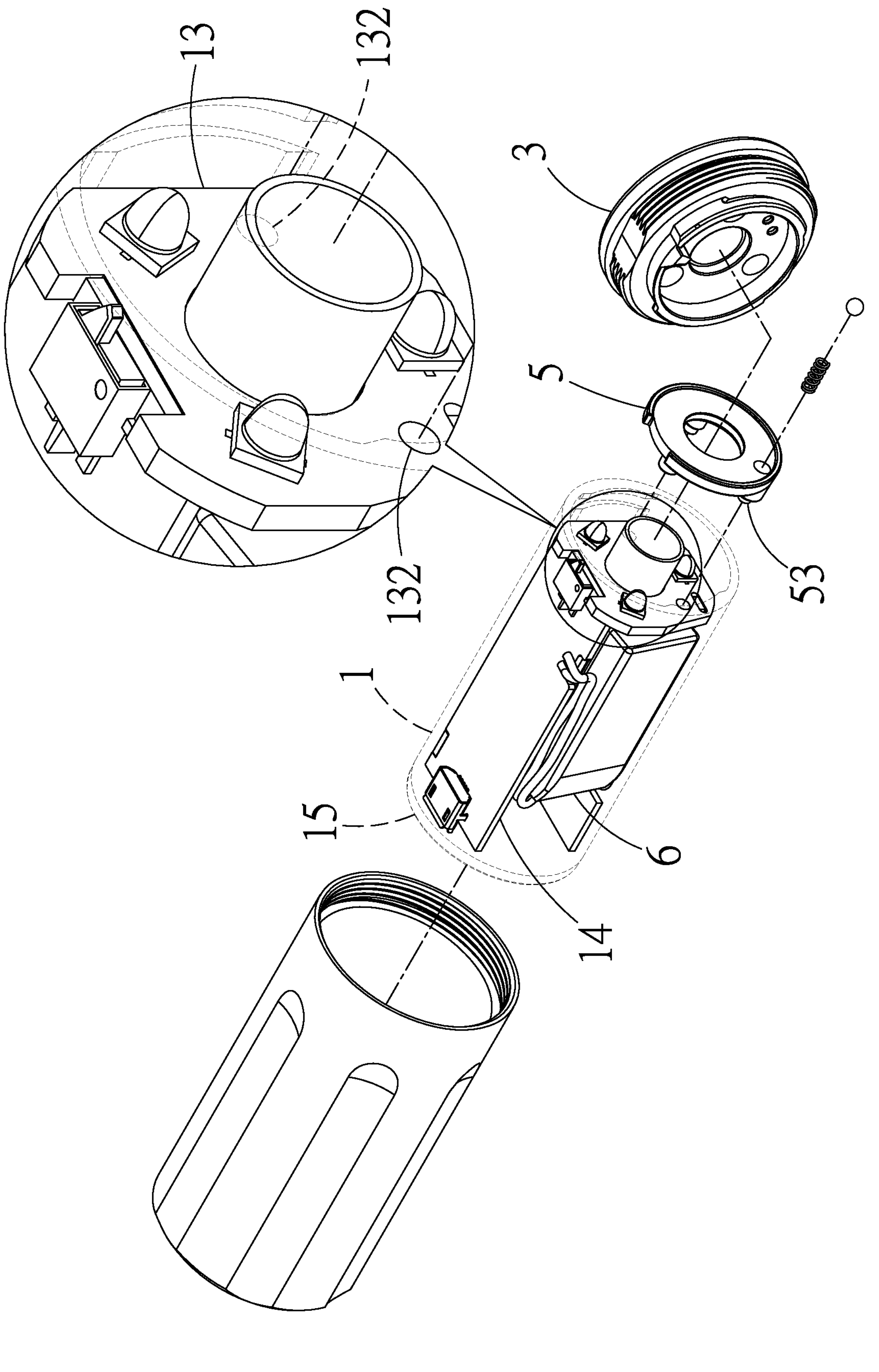
FIG. 12 is an exploded view showing a fourth preferred embodiment of the present invention.
Figure 13:
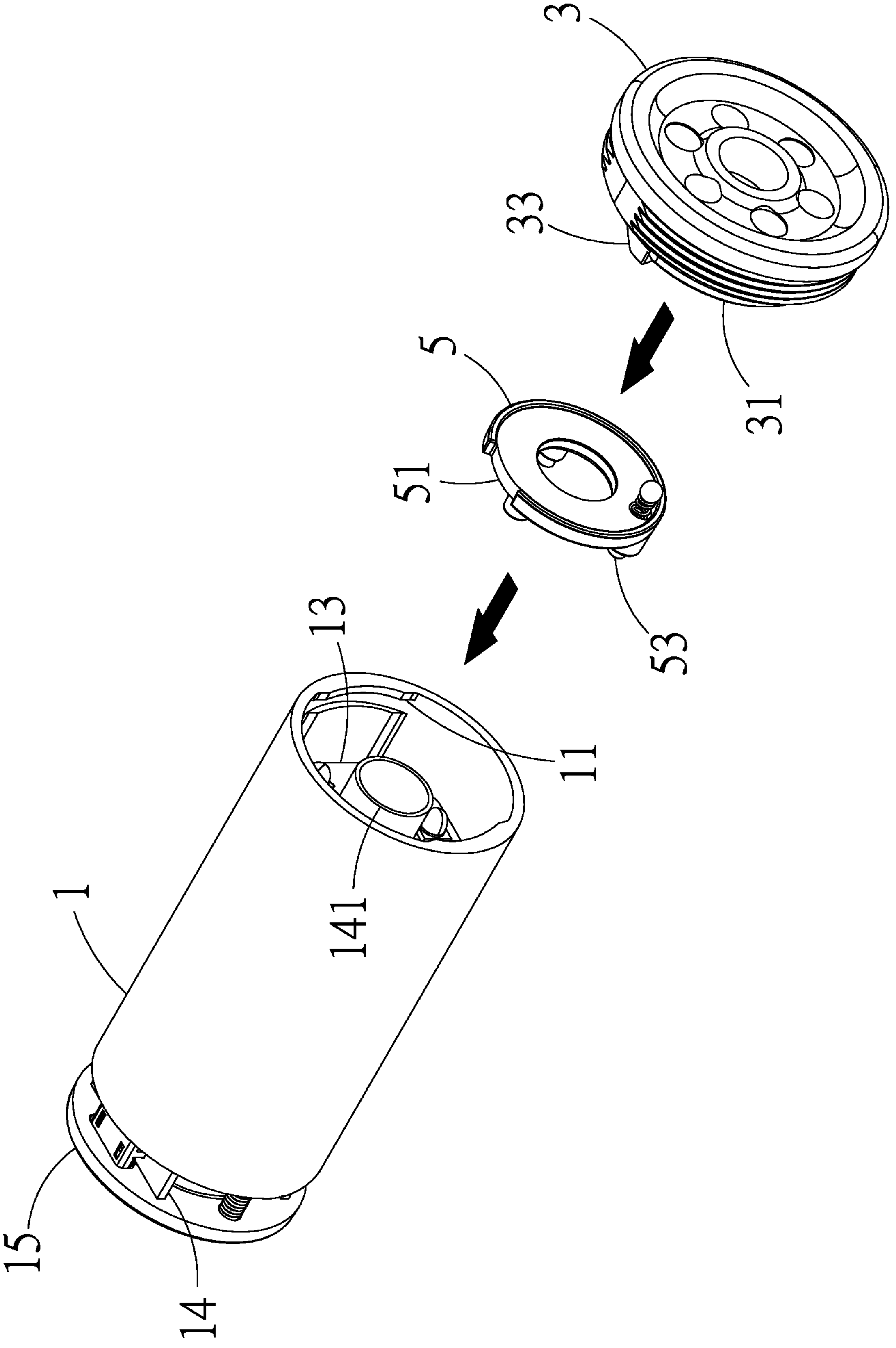
FIG. 13 is a first schematic view showing assembling of the fourth preferred embodiment of the present invention.
Figure 14:
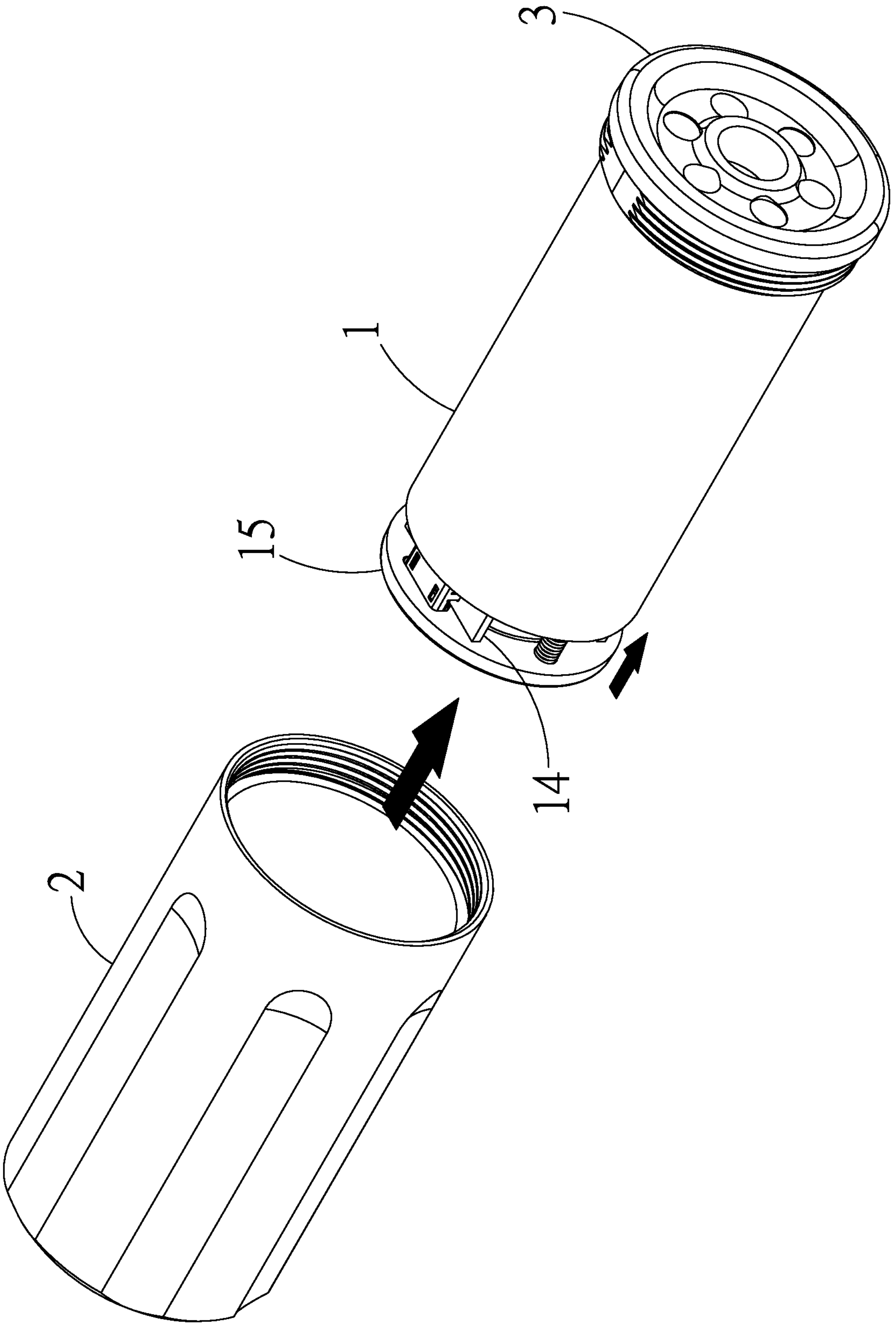
FIG. 14 is a second schematic view showing assembling of the fourth preferred embodiment of the present invention.
Figure 15:
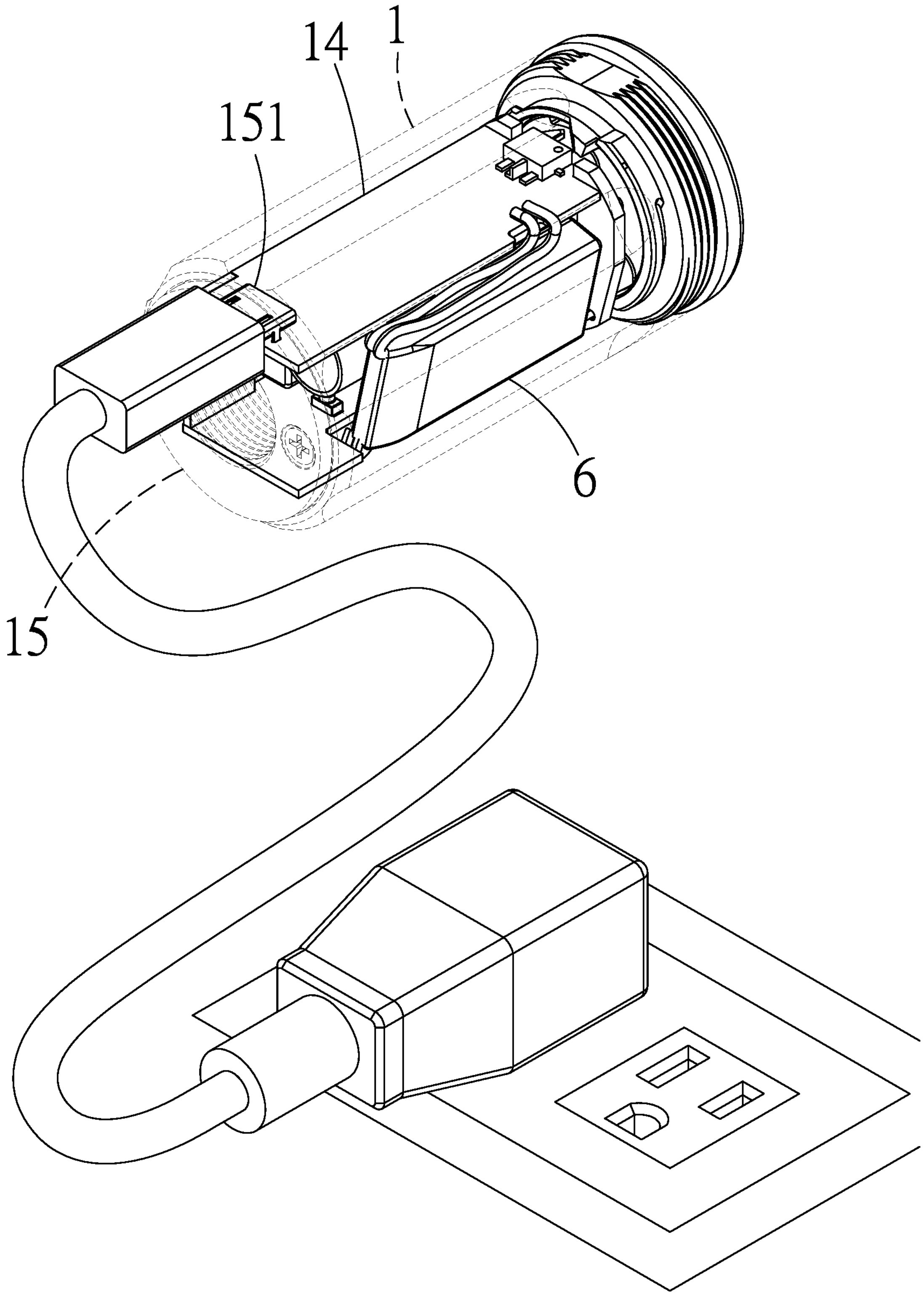
FIG. 15 is a schematic view showing implementing of the fourth preferred embodiment of the present invention.

Referring jointly to FIGS. 9-11, which are an exploded view and a schematic view of structure of a third preferred embodiment of the present invention, it is clearly seen from the drawings that the instant embodiment is generally similar to the previous embodiments and only different in that a positioning alarm assembly 35 is arranged on an inside surface of the front cover element 3, and the illuminator body 1 is provided with an elastic positioning mechanism 4 operative in combination with the positioning alarm assembly 35, wherein the elastic positioning mechanism 4 is formed of a spring 41 and a steel bead 42, and the positioning alarm assembly 35 includes two dimples formed in the inside surface of the front cover element 3, and as such, when the front cover element 3 is being rotated, the steel bead 42 of the elastic positioning mechanism 4 moves from one of the dimples of the positioning alarm assembly 35 into another one of the dimples, and a urging force that the spring 41 applies to push the steel bead 42 causes the steel bead 42 to generate, at the moment of entering said another one of the dimples, perception of impact and metal colliding sound to thereby issue an alarm that allows the user to realize the switching operation of activating/de-activating the illuminator body 1 through rotating the front cover element 3 is completed.

Further, a projectile-protection member 5 is arranged between the illuminator body 1 and the front cover element 3. The projectile-protection member 5 is a light-transmitting material and is arranged in front of a luminous substrate 13 of the illuminator body 1 to prevent a flying projectile or sands/pebbles from flying into the illuminator body 1 to scratch or impact the light emitting elements 131. Further, the projectile-protection member 5 is formed, in a side edge thereof, with a constraining notch 51 through which the actuation block 33 extends to constrain the position of the actuation block 33. Further, the elastic positioning mechanism 4 is arranged in a fixing trough 52 formed in the projectile-protection member 5, and as shown in FIG. 11, which is a rear view of the projectile-protection member 5 and the front cover element 3 combined together, the constraining notch 51 functions to constrain the actuation block 33 within the constraining notch 51, in order to block the actuation block 33 for preventing over rotation of the front cover element 3 and also to prevent the elastic positioning mechanism 4 from separating from the positioning alarm assembly 35 to loss the function of alarming.

Referring jointly to FIGS. 12-15, which are an exploded view to a schematic view of implementing of a fourth preferred embodiment of the present invention, it is clearly seen from the drawings that the instant embodiment is generally similar to the previous embodiments and only different in that a projectile-protection member 5 is arranged between the illuminator body 1 and the front cover element 3. The projectile-protection member 5 includes a plurality of positioning portions 53 on one side thereof. The illuminator body 1 comprises a luminous substrate 13, and the luminous substrate 13 is formed with a plurality of positioning apertures 132 corresponding to and combined with the positioning portions 53. The illuminator body 1 includes an illuminator carrier 14 for mounting the luminous substrate 13 and a base 15 arranged at one side of the illuminator carrier 14 that is opposite to the projectile-protection member 5 to move with the illuminator carrier 14, wherein pegs or pillars are taken as an example for the positioning portions 53. The illuminator carrier 14 itself defines a passage through which a projectile passes and is provided, in addition to mounting of the luminous substrate 13, for mounting at least one electrical power supply element 6. A lithium battery is taken as an example for the electrical power supply element 6.

In this way, in the present invention, before assembling of an illuminator accessory, the base 15 is set in a state of separating from or partly separating from the illuminator body 1, the illuminator carrier 14 is slightly moved backward relative to the illuminator body 1, with the luminous substrate 13 being held away from the first connecting portion 11. Next, the positioning portions 53 are combined with the positioning apertures 132 to have the projectile-protection member 5 sleeved over the projectile exit hole 141 of the illuminator carrier 14. Then, the first coupling portion 31 and the first connecting portion 11 are connected through rotation to have the front cover element 3 and the illuminator body 1 combined together. At this moment, since the illuminator carrier 14 and the projectile-protection member 5 are in a state of being away from the first connecting portion 11, the constraining notch 51 of the projectile-protection member 5 does not interfere with the actuation block 33 of the front cover element 3, meaning not interfering with the connection of the first coupling portion 31 of the front cover element 3 and the first connecting portion 11 of the illuminator body 1 through rotation. And, then, the base 15 is pushed frontward to have the base 15 and the illuminator body 1 tightly joined together and also to have the illuminator carrier 14 and the projectile-protection member 5 move frontwards to insert the actuation block 33 into the constraining notch 51. Finally, the sleeve element 2 is sleeved over the outside of the illuminator body 1 and combined with the front cover element 3 to thereby complete the operation of assembling the present invention. As such, through rotation operation and frontward-rearward movement conducted together to carry out assembling of various components, the overall combination strength can be enhanced through the simple operation of assembling.

Further, the illuminator carrier 14 is provided with a charging portion 151 in electrical connection with the electrical power supply element 6 and exposed outside of the base 15. In the instant embodiment, a USB connector is taken as an example for the charging portion 151. When the electrical power supply element 6 of the illuminator body 1 runs short of electrical power, the illuminator body 1 can be detached from the toy gun and charging of electricity can be implemented through the charging portion 151.

I claim:

1. An illuminator accessory exchange structure, comprising:

an illuminator body, which is adapted to arrange on a toy gun;

a first connecting portion, which is arranged on the illuminator body;

a sleeve element, which is sleeved on an outside of the illuminator body;

a second connecting portion, which is arranged on the sleeve element;

at least one shaping portion, which is arranged on an outer surface of the sleeve element;

a front cover element, which is arranged on a front end of the illuminator body and the sleeve element;

a first coupling portion, which is arranged on one side of the front cover element and corresponds to and connects with the first connecting portion; and a second coupling portion, which is arranged on one side of the front cover element and corresponds to and connects with the second connecting portion;

wherein the illuminator body comprises a changeover switch, and the front cover element is provided, on one side thereof, with an actuation block contactable with and engageable with the changeover switch.

2. The illuminator accessory exchange structure according to claim 1, wherein the front cover element is formed with a plurality of light-transmitting holes and a plurality of shielding troughs, and the illuminator body comprises a plurality of light emitting elements, wherein based on if to switch the changeover switch or not, the light emitting elements are set to correspond in position to the light-transmitting holes or the shielding troughs.

3. The illuminator accessory exchange structure according to claim 1, wherein the front cover element is provided, on an inside surface thereof, with a positioning alarm assembly, and the illuminator body comprises an elastic positioning mechanism operative in combination with the positioning alarm assembly.

4. The illuminator accessory exchange structure according to claim 1, wherein a projectile-protection member is arranged between the illuminator body and the front cover element, and the projectile-protection member is formed, in a side edge thereof, with a constraining notch through which the actuation block extends, in order to constrain a position of the actuation block.

5. The illuminator accessory exchange structure according to claim 1, wherein a projectile-protection member is arranged between the illuminator body and the front cover element, and the projectile-protection member is provided, on one side thereof, with a plurality of positioning portions, and the illuminator body comprises a luminous substrate, the luminous substrate being formed with a plurality of positioning apertures corresponding to and combined with the positioning portions.

6. The illuminator accessory exchange structure according to claim 5, wherein the illuminator body comprises an illuminator carrier for mounting the luminous substrate and a base arranged on one side of the illuminator carrier that is opposite to the projectile-protection member for moving in combination with the illuminator carrier.

7. The illuminator accessory exchange structure according to claim 6, wherein the illuminator carrier comprises at least one electrical power supply element and a charging portion electrically connected with the electrical power supply element and exposed outside of the base.

8. The illuminator accessory exchange structure according to claim 1, wherein the first coupling portion comprises a guide groove and a stop portion formed at one end of the guide groove.

* * * * *